(12) United States Patent
Miyagi

(10) Patent No.: US 11,697,484 B2
(45) Date of Patent: Jul. 11, 2023

(54) MARINE PROPULSION SYSTEM AND CONTROL METHOD

(71) Applicant: YAMAHA HATSUDOKI KABUSHIKI KAISHA, Iwata (JP)

(72) Inventor: Yuta Miyagi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 283 days.

(21) Appl. No.: 17/174,422

(22) Filed: Feb. 12, 2021

(65) Prior Publication Data
US 2021/0276685 A1 Sep. 9, 2021

(30) Foreign Application Priority Data
Mar. 3, 2020 (JP) .................. 2020-036125

(51) Int. Cl.
*B63H 21/17* (2006.01)
*H02P 29/024* (2016.01)
*B63H 23/34* (2006.01)
*H02M 1/32* (2007.01)

(52) U.S. Cl.
CPC ............. *B63H 21/17* (2013.01); *B63H 23/34* (2013.01); *H02M 1/32* (2013.01); *H02P 29/0241* (2016.02)

(58) Field of Classification Search
CPC ..... B63H 21/17; B63H 23/24; H02P 29/0241; H02M 1/32
See application file for complete search history.

(56) References Cited

U.S. PATENT DOCUMENTS

| 2010/0248560 | A1 | 9/2010 | Ito et al. |
| 2014/0070743 | A1* | 3/2014 | Yoshida ............... H02P 29/024 |
| | | | 318/400.22 |
| 2017/0349256 | A1 | 12/2017 | Nakamura |

FOREIGN PATENT DOCUMENTS

| EP | 3 613 664 A1 | 2/2020 |
| JP | 2017-218016 A | 12/2017 |

OTHER PUBLICATIONS

Official Communication issued in corresponding European Patent Application No. 21158943.7, dated Sep. 9, 2021.

\* cited by examiner

*Primary Examiner* — Stephen P Avila
(74) *Attorney, Agent, or Firm* — Keating and Bennett, LLP

(57) ABSTRACT

A marine propulsion system includes marine propulsion devices each including a propeller shaft, an engine, an electric motor, a power transmission, an inverter, a voltage sensor, and a controller. The power transmission transmits mechanical power to the propeller shaft from at least one of the engine and the electric motor. The inverter outputs electric power inputted thereto to the electric motor after converting the electric power. The voltage sensor detects induced voltage generated by the electric motor. The controller executes a protection control to protect the inverter when the induced voltage is greater than a first threshold while the electric motor is not being driven.

15 Claims, 11 Drawing Sheets

MARINE PROPULSION SYSTEM AND CONTROL METHOD

CROSS REFERENCE TO RELATED APPLICATIONS

This application claims the benefit of priority to Japanese Patent Application No. 2020-036125 filed on Mar. 3, 2020. The entire contents of this application are hereby incorporated herein by reference.

BACKGROUND OF THE INVENTION

1. Field of the Invention

The present invention relates to a marine propulsion system and a control method thereof.

2. Description of the Related Art

There has been conventionally known a type of marine propulsion device including both an engine and an electric motor as mechanical power sources for rotating a propeller of a watercraft. Such a marine propulsion device is configured to rotate the propeller only by a drive force of the electric motor in an extremely low speed range and is also configured to rotate the propeller by a drive force of the engine at a predetermined speed or greater (see Japan Laid-open Patent Application Publication No. 2017-218016). The electric motor is supplied with electric power from a battery through an inverter.

In some cases, a plurality of marine propulsion devices are mounted to a watercraft. For example, when three marine propulsion devices, each of which is configured as described above, are mounted to a watercraft, only two marine propulsion devices located on the port and starboard sides are configured to be driven to propel the watercraft depending on the situation. At this time, it can be assumed in the other marine propulsion device located in the middle of the two marine propulsion devices that an induced voltage is generated by an electric motor when entrained rotation of the electric motor occurs through a propeller rotated by driving of the two marine propulsion devices. Additionally, in the middle marine propulsion device, an inverter generates heat due to the induced voltage generated by the electric motor. Thus, there is a concern that there are adverse effects on the inverter.

SUMMARY OF THE INVENTION

Preferred embodiments of the present invention protect inverters from induced voltage generated by entrained rotation of electric motors in marine propulsion systems each including a plurality of marine propulsion devices.

A marine propulsion system according to a first preferred embodiment of the present invention includes a plurality of marine propulsion devices. Each of the plurality of marine propulsion devices includes a propeller shaft, an engine, an electric motor, a power transmission, an inverter, a voltage sensor, and a controller. The power transmission transmits mechanical power to the propeller shaft from at least one of the engine and the electric motor. The inverter outputs electric power inputted thereto to the electric motor after converting the electric power. The voltage sensor detects induced voltage generated by the electric motor. The controller is configured or programmed to execute a protection control to protect the inverter when the induced voltage is greater than a first threshold while the electric motor is not being driven.

A marine propulsion system according to a second preferred embodiment of the present invention includes a plurality of marine propulsion devices. Each of the plurality of marine propulsion devices includes a propeller shaft, an engine, an electric motor, a power transmission, an inverter, an entrained rotation determiner, and a controller. The power transmission transmits mechanical power to the propeller shaft from at least one of the engine and the electric motor. The inverter outputs electric power inputted thereto to the electric motor after converting the electric power. The entrained rotation determiner determines whether or not entrained rotation of the electric motor occurs. The controller is configured or programmed to execute a protection control to protect the inverter when the entrained rotation determiner determines that entrained rotation of the electric motor occurs.

A control method according to a third preferred embodiment of the present invention controls a marine propulsion system. The marine propulsion system includes a plurality of marine propulsion devices. Each of the plurality of marine propulsion devices includes a propeller shaft, an engine, an electric motor, a power transmission, and an inverter. The power transmission transmits mechanical power to the propeller shaft from at least one of the engine and the electric motor. The inverter outputs electric power inputted thereto to the electric motor after converting the electric motor. The method includes detecting an induced voltage generated by the electric motor, and executing a protection control to protect the inverter when the induced voltage is greater than a first threshold while the electric motor is not being driven.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
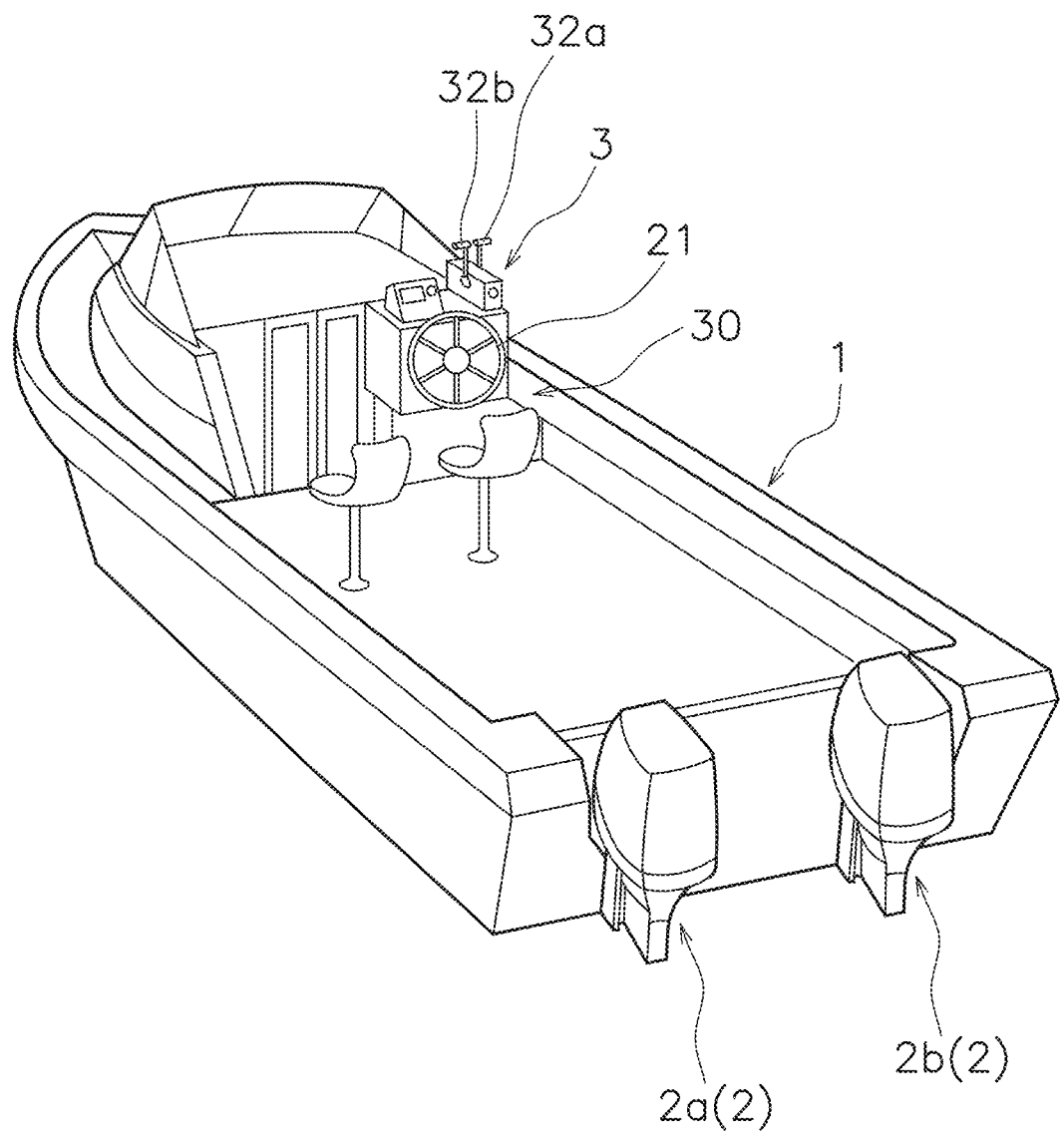
FIG. 1 is a perspective view of a watercraft including a marine propulsion system.
Figure 2:
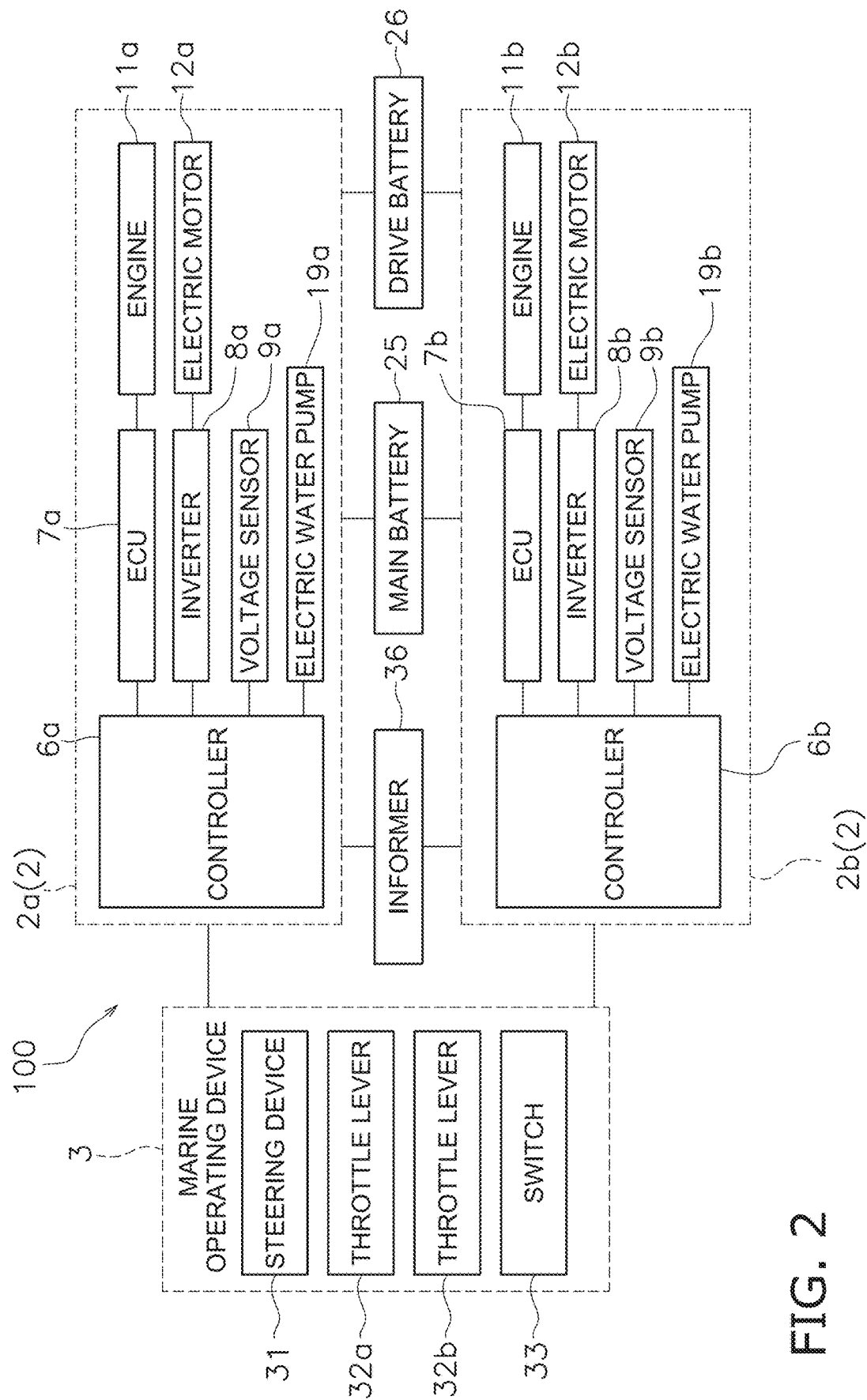
FIG. 2 is a block diagram showing a configuration of the marine propulsion system.

Preferred embodiments of the present invention will be hereinafter explained with reference to drawings. FIG. 1 is a perspective view of a watercraft 1 including a marine propulsion system 100 according to a first preferred embodiment of the present invention. FIG. 2 is a block diagram showing a configuration of the marine propulsion system 100. The marine propulsion system 100 includes a plurality of outboard motors 2 and a marine operating device 3.

Each outboard motor 2 generates a thrust to propel the watercraft 1. Each outboard motor 2 is an exemplary marine propulsion device. In the following explanation, the outboard motor 2 attached to a port portion of the stern of the watercraft 1 will be referred to as a first outboard motor 2a, whereas the outboard motor 2 attached to a starboard portion of the stern of the watercraft 1 will be referred to as a second outboard motor 2b.

Figure 3:
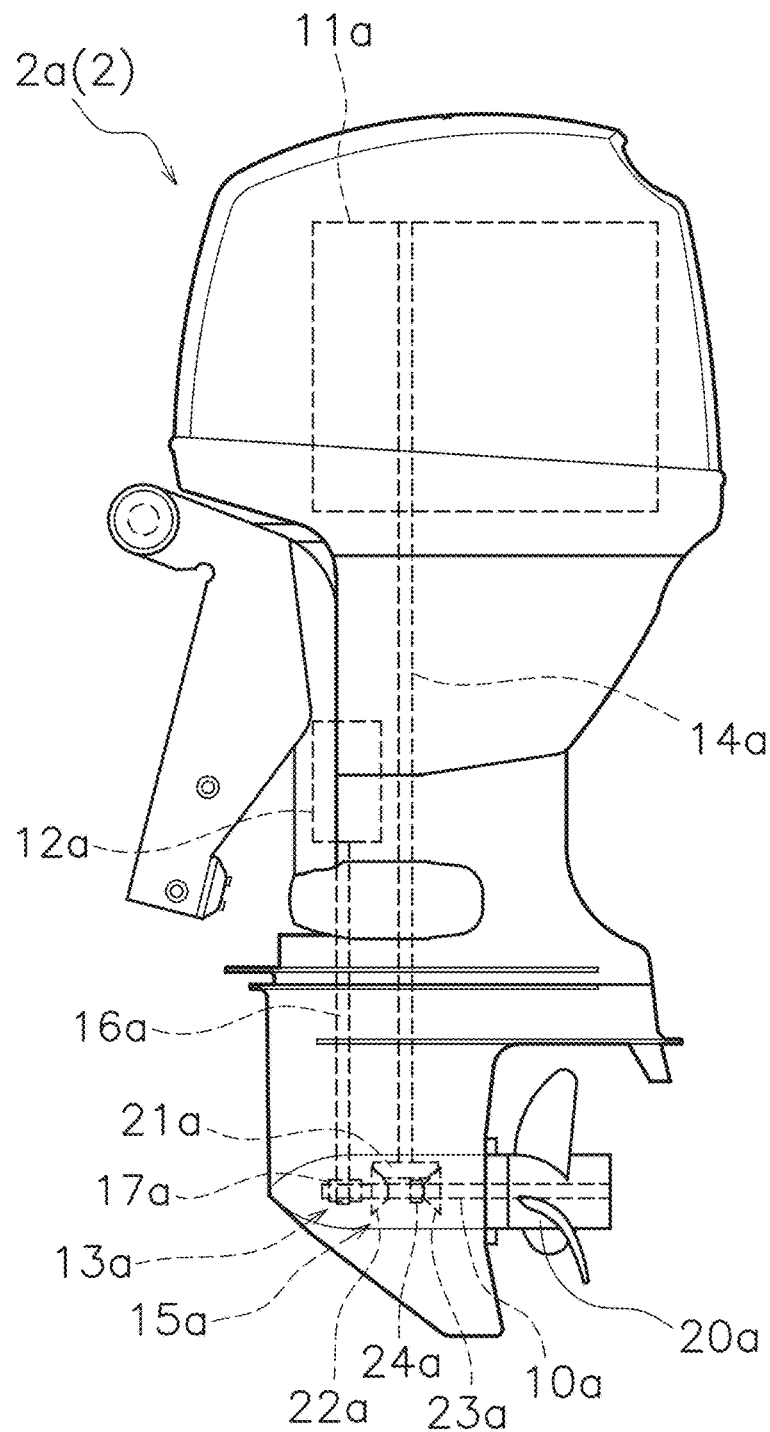
FIG. 3 is a side view of an outboard motor.

FIG. 3 is a side view of the first outboard motor 2a. The first outboard motor 2a includes a propeller shaft 10a, an engine 11a, an electric motor 12a, and a power transmission 13a. It should be noted that the second outboard motor 2b has a similar structure to the first outboard motor 2a.

The propeller shaft 10a extends in the back-and-forth direction of the watercraft 1. A propeller 20a is attached to the propeller shaft 10a and is unitarily rotated therewith. Each of the engine 11a and the electric motor 12a is a mechanical power source that generates the thrust to propel the watercraft 1.

The power transmission 13a transmits mechanical power to the propeller shaft 10a from at least one of the engine 11a and the electric motor 12a. In the present preferred embodiment, the power transmission 13a transmits mechanical power to the propeller shaft 10a from either one of the engine 11a and the electric motor 12a. The power transmission 13a includes a drive shaft 14a, an engine clutch 15a, a motor shaft 16a, and a motor clutch 17a.

The drive shaft 14a extends in the vertical direction. The drive shaft 14a is rotated when driven by the engine 11a. The engine clutch 15a connects or disconnects the drive shaft 14a and the propeller shaft 10a to or from each other. Additionally, the engine clutch 15a switches between rotational directions of the propeller shaft 10a.

The engine clutch 15a includes a drive gear 21a, a forward moving gear 22a, a rearward moving gear 23a, and a dog clutch 24a. The drive gear 21a is rotated unitarily with the drive shaft 14a. The forward moving gear 22a and the rearward moving gear 23a are meshed with the drive gear 21a. Rotation of the drive shaft 14a is transmitted to the forward moving gear 22a and the rearward moving gear 23a through the drive gear 21a. The dog clutch 24a is movable to a forward moving position, a neutral position, and a rearward moving position.

When the dog clutch 24a is in the forward moving position, the forward moving gear 22a is connected to the propeller shaft 10a, such that rotation of the drive shaft 14a is transmitted to the propeller shaft 10a through the forward moving gear 22a. When the dog clutch 24a is in the neutral position, the propeller shaft 10a is disconnected from the forward moving gear 22a and the rearward moving gear 23a, such that rotation of the drive shaft 14a is not transmitted to the propeller shaft 10a. When the dog clutch 24a is in the rearward moving position, the rearward moving gear 23a is connected to the propeller shaft 10a, such that rotation of the drive shaft 14a is transmitted to the propeller shaft 10a through the rearward moving gear 23a.

The motor shaft 16a extends parallel or substantially parallel to the drive shaft 14a. The motor shaft 16a is rotated when driven by the electric motor 12a. The motor clutch 17a connects or disconnects the motor shaft 16a and the propeller shaft 10a to or from each other. The motor clutch 17a is movable to a connecting position or a disconnecting position. When the motor clutch 17a is in the connecting position, rotation of the motor shaft 16a is transmitted to the propeller shaft 10a through a motor gear (not shown in the drawings). When the motor clutch 17a is in the disconnecting position, the propeller shaft 10a is disconnected from the motor gear, such that rotation of the motor shaft 16a is not transmitted to the propeller shaft 10a.

As shown in FIG. 2, the first outboard motor 2a includes a controller 6a, an ECU (Electric Control Unit) 7a, an inverter 8a, and a voltage sensor 9a. The controller 6a is configured or programmed to control the first outboard motor 2a. The controller 6a includes a processor such as a CPU (Central Processing Unit) and memories such as a RAM (Random Access Memory) and a ROM (Read Only Memory). The controller 6a stores programs and data to control the first outboard motor 2a.

The controller 6a controls movement of the engine clutch 15a and that of the motor clutch 17a through actuators (not shown in the drawings) in accordance with an operating signal transmitted thereto from the marine operating device 3. The controller 6a controls driving and output of the engine 11a and/or the electric motor 12a in accordance with the operating signal transmitted thereto from the marine operating device 3. It should be noted that in the present preferred embodiment, the controller 6a controls the engine clutch 15a and the engine 11a through the ECU 7a. The controller 6a may be located inside the first outboard motor 2a, or alternatively, may be located outside the first outboard motor 2a.

The ECU 7a controls the engine clutch 15a and the engine 11a based on a command issued by the controller 6a. For example, the ECU 7a controls the action of the engine clutch 15a and driving and output of the engine 11a in accordance with the command issued by the controller 6a. The ECU 7a includes a processor such as a CPU and memories such as a RAM and a ROM.

Figure 4:
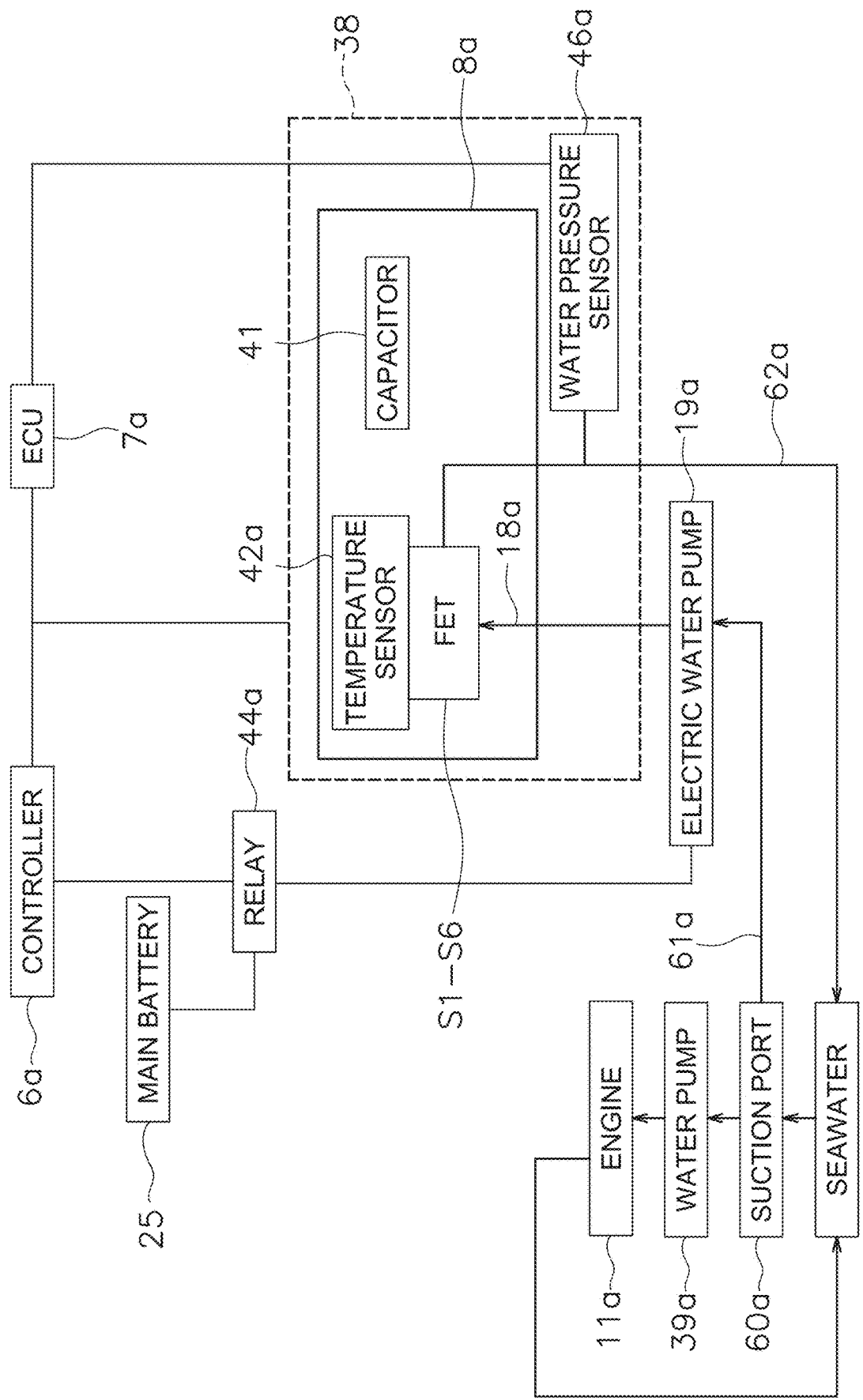
FIG. 4 is a block diagram showing a configuration of a cooling system to cool an inverter.
Figure 5:
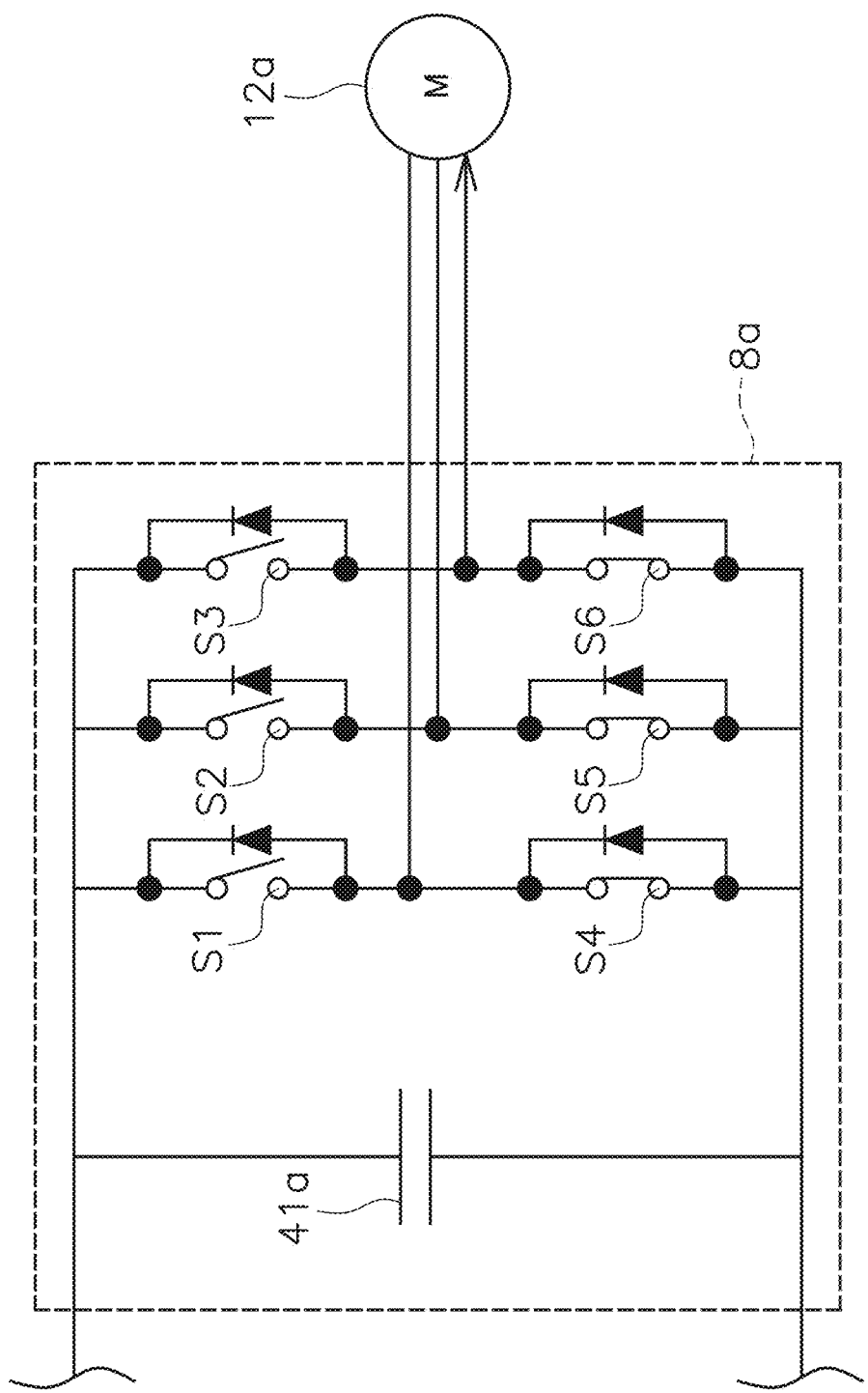
FIG. 5 is a circuit diagram of the inverter.

FIG. 4 is a block diagram showing a configuration of a cooling system to cool the inverter 8a. FIG. 5 is a circuit diagram of the inverter 8a. The inverter 8a controls driving and output of the electric motor 12a in accordance with the command issued by the controller 6a. The inverter 8a converts a direct voltage inputted thereto from a drive battery 26 (to be described) into an alternating voltage and outputs the alternating voltage to the electric motor 12a. The inverter 8a is accommodated in a waterproof casing 38 located inside the first outboard motor 2a.

The inverter 8a includes switching elements S1 to S6, a capacitor 41a, and a temperature sensor 42a. For example, the switching elements S1 to S6 include transistors. The switching elements S1 to S6 include six switching elements corresponding to U, V, and W phases. A free-wheeling diode is connected in parallel to each of the switching elements S1 to S6. The capacitor 41a is a smoothing capacitor and suppresses fluctuations in the direct voltage. The temperature sensor 42a detects a temperature of the inverter 8a and outputs a detection signal to the controller 6a. The temperature sensor 42a detects, for instance, temperatures of the switching elements S1 to S6 in the inverter 8a.

The voltage sensor 9a detects an induced voltage generated by the electric motor 12a and outputs a detection signal to the controller 6a. The controller 6a executes a protection control to protect the inverter 8*a* when the induced voltage, detected by the voltage sensor 9*a*, is greater than a first threshold while the electric motor 12*a* is not being driven. The protection control will be described below in detail.

As shown in FIG. 4, the first outboard motor 2*a* further includes a cooling water passage 18*a* and an electric water pump 19*a*. The cooling water passage 18*a* is connected to the inverter 8*a*. The cooling water passage 18*a*, described more specifically, is connected to a water jacket (not shown in the drawings) mounted to the inverter 8*a*.

The electric water pump 19*a* is connected to the cooling water passage 18*a*. The electric water pump 19*a* supplies seawater to the cooling water passage 18*a*. The electric water pump 19*a* is controlled by the controller 6*a* and is driven by electric power supplied thereto from a main battery 25 (to be described). The controller 6*a* controls driving of the electric water pump 19*a* by, for instance, controlling a relay 44*a* that connects or disconnects the electric water pump 19*a* and the main battery 25 to or from each other. The controller 6*a* drives the electric water pump 19*a* when the electric motor 12*a* is being driven. The electric water pump 19*a* includes a motor and an impeller.

As shown in FIG. 4, the first outboard motor 2*a* includes a water suction port 60*a*, a water suction passage 61*a*, and a water drainage passage 62*a*. The water suction port 60*a* is an opening to take seawater into the first outboard motor 2*a*. The water suction passage 61*a* extends from the water suction port 60*a* to the cooling water passage 18*a*. The water drainage passage 62*a* is connected to the cooling water passage 18*a*. As depicted with arrows in FIG. 4, the seawater taken through the water suction port 60*a* passes through the water suction passage 61*a*, is supplied to the cooling water passage 18*a* by the electric water pump 19*a*, and is then drained outside the first outboard motor 2*a* through the water drainage passage 62*a*. It should be noted that the first outboard motor 2*a* includes a water pump 39*a* to cool the engine 11*a*. The water pump 39*a* is driven by rotation of the drive shaft 14*a*.

The first outboard motor 2*a* may further include a water pressure sensor 46*a* to detect the water pressure in the cooling water passage 18*a*. The water pressure sensor 46*a* detects the water pressure in the cooling water passage 18*a* and outputs a detection signal. The controller 6*a* stops driving the inverter 8*a* when a malfunction of the cooling water passage 18*a* is detected based on the detection signal outputted from the water pressure sensor 46*a*. The detection signal, outputted from the water pressure sensor 46*a*, is transmitted to the controller 6*a* through the ECU 7*a*. It should be noted that the detection signal, outputted from the water pressure sensor 46*a*, may be directly transmitted to the controller 6*a* without passing through the ECU 7*a*.

As shown in FIG. 2, the main battery 25 and the drive battery 26 to drive the electric motor 12*a* are connected to the first outboard motor 2*a*. For example, the main battery 25 is a lead battery of 12V and supplies electric power to the first outboard motor 2*a*. The drive battery 26 is a lead battery of 36V, for example, and supplies electric power to the inverter 8*a*. The drive battery 26 includes, for instance, three lead batteries of 12V connected in series. It should be noted that in the present preferred embodiment, both the main battery 25 and the drive battery 26 are able to supply electric power to the inverter 8*a*.

The first outboard motor 2*a* is provided with an electric power generator to generate electric power when driven by the engine 11*a*. The electric power generated by the electric power generator is supplied to the main battery 25 and the drive battery 26. The electric power generator includes, for instance, a rotor and a stator. The electric power generator generates electric power when the rotor connected to the drive shaft 14*a* is rotated with respect to the stator. It should be noted that the electric power, generated by the electric power generator, is supplied to the drive battery 26, for instance, after being rectified and controlled in voltage by a rectifier voltage regulator and further being increased in voltage to 36V, for example, by a DC/DC converter.

As shown in FIG. 2, similarly to the first outboard motor 2*a*, the second outboard motor 2*b* includes a controller 6*b*, an ECU 7*b*, an inverter 8*b*, a voltage sensor 9*b*, an engine 11*b*, an electric motor 12*b*, and an electric water pump 19*b*. The main battery 25 and the drive battery 26 are connected to the second outboard motor 2*b*. It should be noted that the configuration of the second outboard motor 2*b* is similar to that of the first outboard motor 2*a*, and thus, the detailed explanation thereof will be omitted.

The controller 6*a* of the first outboard motor 2*a* and the controller 6*b* of the second outboard motor 2*b* are connected through wireless communication. The controllers 6*a* and 6*b* of the first and second outboard motors 2*a* and 2*b* are communicable to each other, while each is supplied with electric power from the main battery 25. The controllers 6*a* and 6*b* of the first and second outboard motors 2*a* and 2*b* may be connected through wired communication. It should be noted that the controllers 6*a* and 6*b* of the first and second outboard motors 2*a* and 2*b* may not be necessarily configured to be communicable to each other.

The marine operating device 3 is located in a cockpit 30 on the watercraft 1. As shown in FIG. 2, the marine operating device 3 includes a steering device 31, throttle levers 32*a* and 32*b*, and a plurality of switches 33. The steering device 31 operates the turning direction of the watercraft 1. The throttle lever 32*a* regulates a thrust generated by the first outboard motor 2*a* and switching the direction of the thrust between forward and rearward directions. The throttle lever 32*b* regulates a thrust generated by the second outboard motor 2*b* and switches the direction of the thrust between forward and rearward directions.

The plurality of switches 33 include a switch to start each engine 11*a*, 11*b*, a switch to set the vessel speed, and a switch to switch each outboard motor 2*a*, 2*b* among drive modes. Additionally, the plurality of switches 33 may include a switch to connect or disconnect the main battery 25 and both the inverter 8*a* and the controller 6*a* to or from each other, and a switch to connect or disconnect the main battery 25 and both the inverter 8*b* and the controller 6*b* to or from each other.

Figure 6:
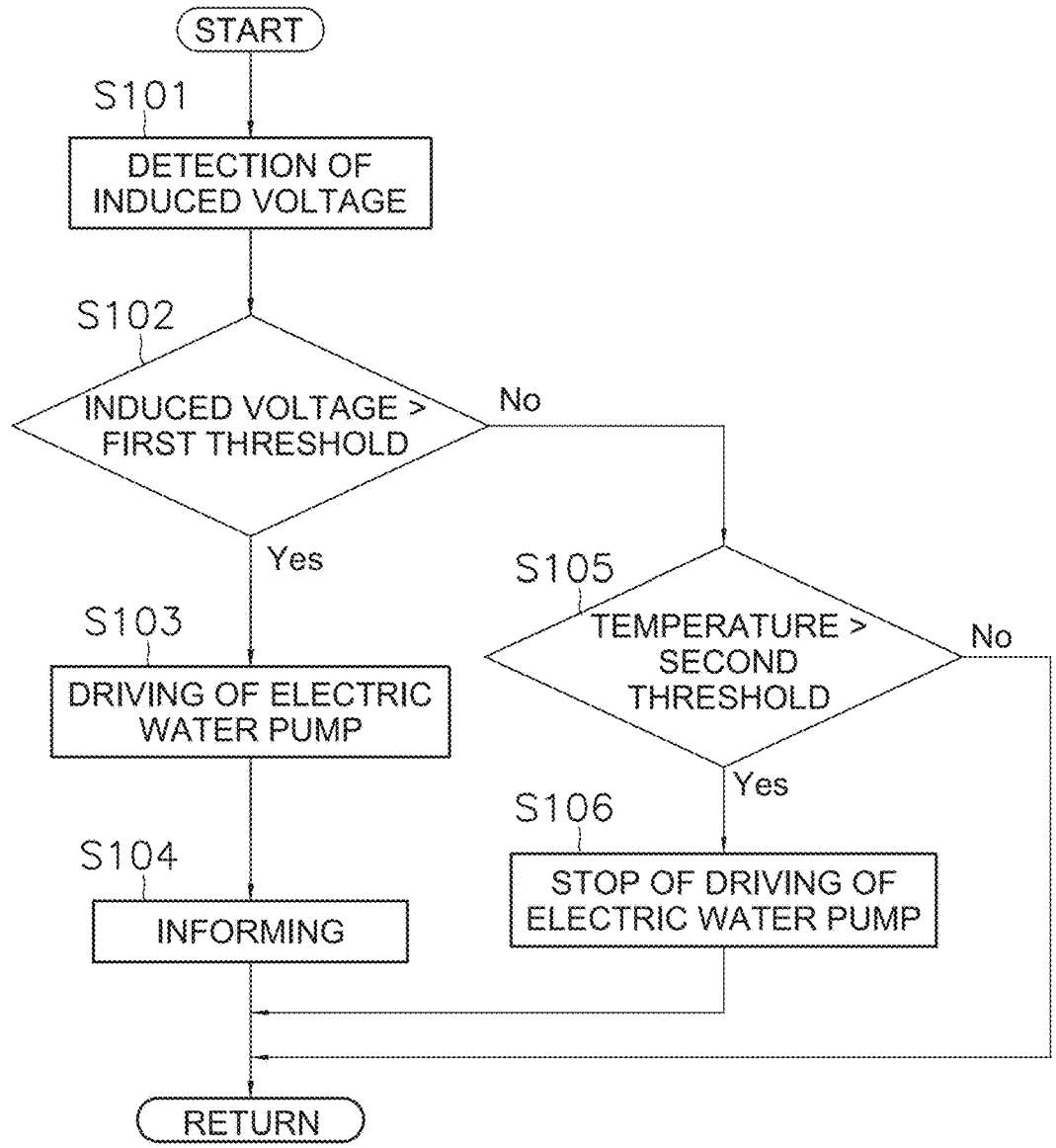
FIG. 6 is a flowchart showing a series of processes of a protection control for the inverter.

Next, a series of control processes to be executed by the controller 6*a* will be explained with reference to FIG. 6. FIG. 6 is a flowchart showing a series of control processes to protect the inverter 8*a* to be executed by the controller 6*a* when the controller 6*a* is supplied with electric power. The series of control processes to protect the inverter 8*a* is executed when the electric motor 12*a* is not being driven. It should be noted that the controller 6*b* also executes a series of control processes similar to the series of control processes herein executed by the controller 6*a*.

In step S101, the controller 6*a* receives a detection signal outputted from the voltage sensor 9*a* and detects induced voltage generated by the electric motor 12*a*.

In step S102, it is determined whether or not the induced voltage detected in step S101 is greater than a first threshold. When it is determined that the induced voltage detected in step S101 is greater than the first threshold, the controller 6*a* executes the process of step S103. In step S103, the controller 6*a* controls the relay 44*a* to drive the electric water pump 19*a*. Step S103 is exemplary protection control to protect the inverter 8*a*.

In step S104, the controller 6*a* informs a watercraft operator that the electric water pump 19*a* is being driven. As shown in FIG. 2, the marine propulsion system 100 may herein further include an informer 36. The controller 6*a* informs the watercraft operator that the electric water pump 19*a* is being driven by, for example, sound, light, an indication displayed on a display device, or so forth through the informer 36. Afterward, the controller 6*a* repeatedly executes the series of processes from step S101. It should be noted that step S104 may be omitted.

In step S102, when it is determined that the induced voltage detected in step S101 is less than or equal to the first threshold, the controller 6*a* executes the process of step S105. In step S105, the controller 6*a* determines whether or not the electric water pump 19*a* is being driven. When it is determined that the electric water pump 19*a* is being driven, the controller 6*a* executes the process of step S106.

In step S106, the controller 6*a* stops the electric water pump 19*a* from being driven. In other words, the controller 6*a* stops the electric water pump 19*a* from being driven when the induced voltage becomes less than or equal to the first threshold while the electric water pump 19*a* is being driven. At this time, the controller 6*a* stops the informer 36 from executing the informing processing. Afterward, the controller 6*a* repeatedly executes the series of processes from step S101.

In step S105, when it is determined that the electric water pump 19*a* is not being driven, the controller 6*a* repeatedly executes the series of processes from step S101.

In the marine propulsion system 100 described above, when the induced voltage, generated by entrained rotation of the electric motor 12*a*, is greater than the first threshold, the controller 6*a* executes the protection control to protect the inverter 8*a*. Specifically, when the induced voltage is greater than the first threshold, the controller 6*a* drives the electric water pump 19*a* so as to cool the inverter 8*a*. Accordingly, heating of the inverter 8*a* due to the induced voltage is significantly reduced or prevented. As a result, the inverter 8*a* is protected from the induced voltage generated by entrained rotation of the electric motor 12*a*.

Figure 7:
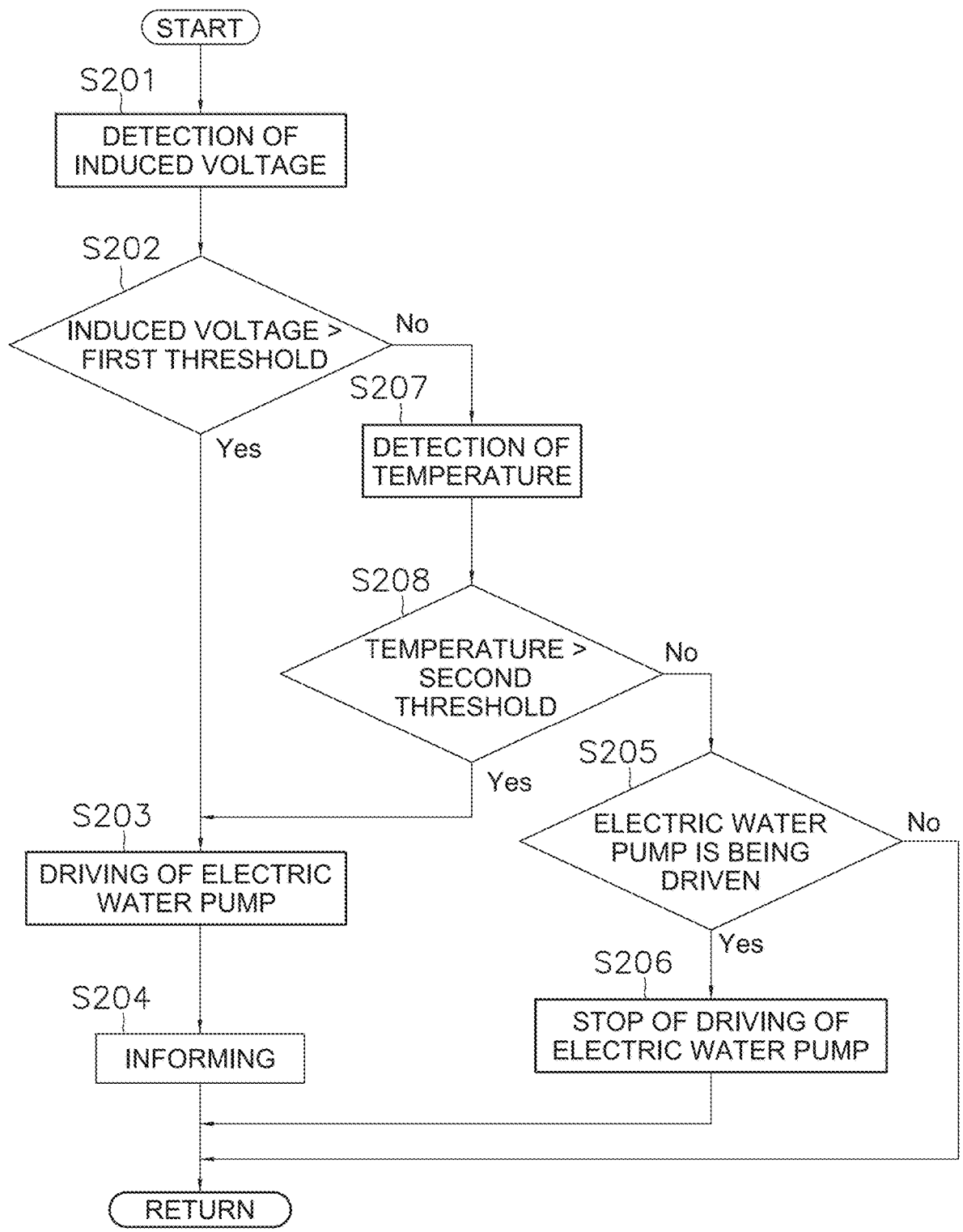
FIG. 7 is a flowchart showing a series of processes of a protection control for the inverter according to a second preferred embodiment of the present invention.

FIG. 7 is a flowchart showing a series of control processes to be executed by the controller 6*a* according to a second preferred embodiment of the present invention. In the second preferred embodiment, when the temperature of the inverter 8*a* is greater than a second threshold, the controller 6*a* drives the electric water pump 19*a*. It should be noted that the series of control processes to be executed by the controller 6*a* as shown in FIG. 7 is obtained by adding the processes of steps S207 and S208 to that in the first preferred embodiment and is, except for this, similar to that in the first preferred embodiment. Therefore, the series of processes of steps S201 to S206 is similar to that of steps S101 to S106 shown in FIG. 6, and explanation thereof will be hereinafter omitted.

In step S202, when it is determined that the induced voltage detected in step S201 is less than or equal to the first threshold, the controller 6*a* executes the process of step S207. In step S207, the controller 6*a* receives a detection signal outputted from the temperature sensor 42*a* and detects the temperature of the inverter 8*a*.

In step S208, the controller 6*a* determines whether or not the temperature of the inverter 8*a*, detected in step S207, is greater than the second threshold. When it is determined that the temperature of the inverter 8*a*, detected in step S207, is greater than the second threshold, the controller 6*a* drives the electric water pump 19*a* (step S203). In step S208, when it is determined that the temperature of the inverter 8*a* is not greater than the second threshold, the controller 6*a* executes the process of step S205.

Figure 8:
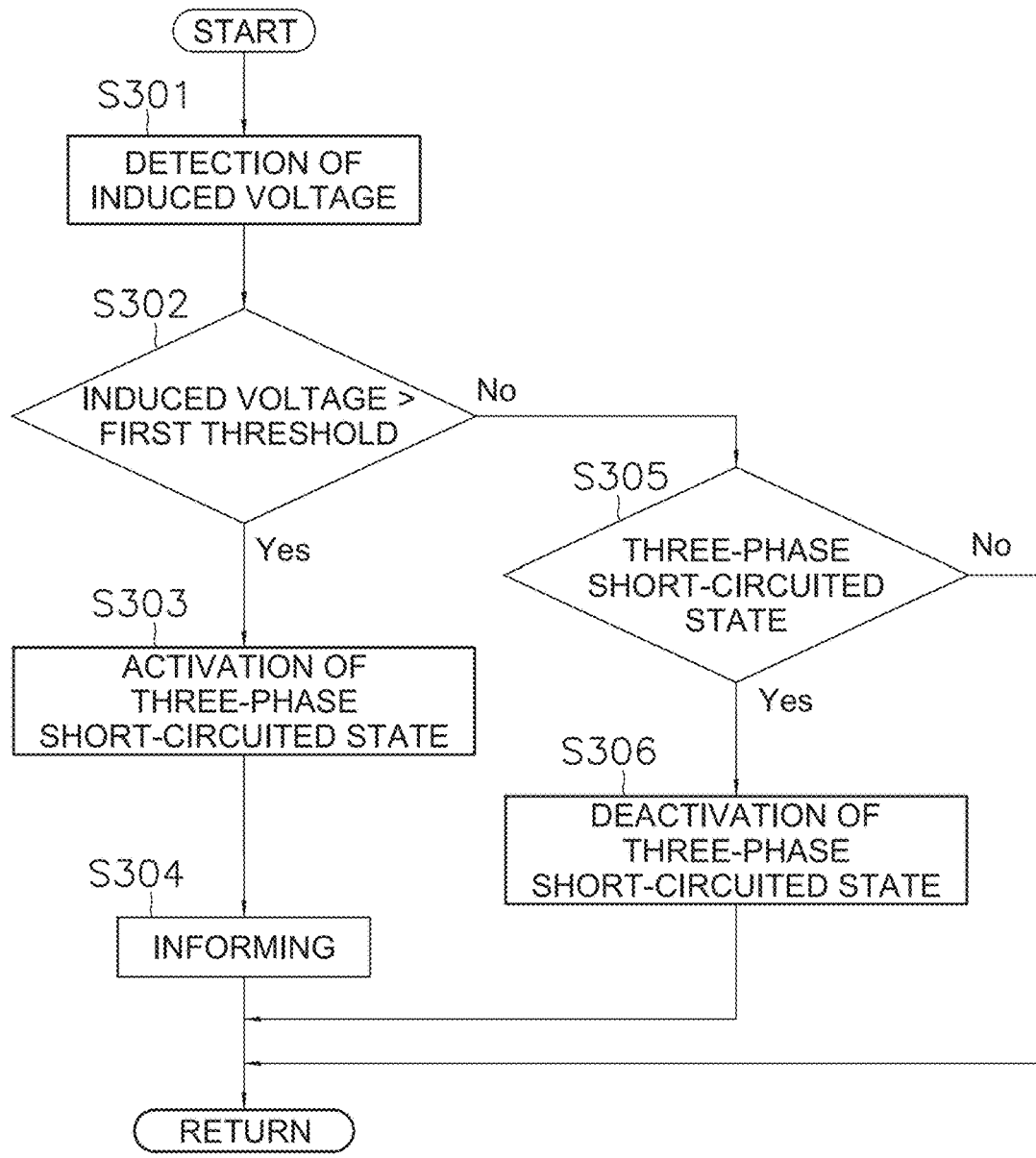
FIG. 8 is a flowchart showing a series of processes of a protection control for the inverter according to a third preferred embodiment of the present invention.

FIG. 8 is a flowchart showing a series of control processes to be executed by the controller 6*a* in a third preferred embodiment of the present invention. The third preferred embodiment is different from the first preferred embodiment regarding the control processes to protect the inverter 8*a* to be executed by the controller 6*a*. Described more specifically, the controller 6*a* protects the inverter 8*a* by driving the electric water pump 19*a* in the first preferred embodiment, whereas the controller 6*a* protects the inverter 8*a* by bringing the inverter 8*a* into a three-phase short-circuit state.

The process of step S301 is identical to that of step S101. The process of step S302 is identical to that of step S102.

In step S303, the controller 6*a* brings the inverter 8*a* into the three-phase short-circuit state. Specifically, as shown in FIG. 5, for instance, the controller 6*a* controls the switching elements S1 to S3 to be turned off while controlling the switching elements S4 to S6 to be turned on. Accordingly, a short-circuit current is caused to flow through the electric motor 12*a*. Thus, electric current due to the induced voltage is prevented from flowing through the capacitor 41*a*. Step S303 is an exemplary protection control to protect the inverter 8*a*.

The process of step S304 is similar to that of step S104. In step S305, the controller 6*a* determines whether or not the inverter 8*a* is in the three-phase short-circuit state. When it is determined that the inverter 8*a* is in the three-phase short-circuit state, the controller 6*a* executes the process of step S306. In step S306, the controller 6*a* cancels the three-phase short-circuit state of the inverter 8*a*. In other words, the controller 6*a* cancels the three-phase short-circuit state of the inverter 8*a* when the induced voltage becomes less than or equal to the first threshold while the inverter 8*a* is in the three-phase short-circuit state. Specifically, the controller 6*a* controls all the switching elements S1 to S6 to be turned off. It should be noted that in step S305, when it is determined that the inverter 8*a* is not in the three-phase short-circuit state, the controller 6*a* repeatedly executes the series of processes from step S301.

Figure 9:
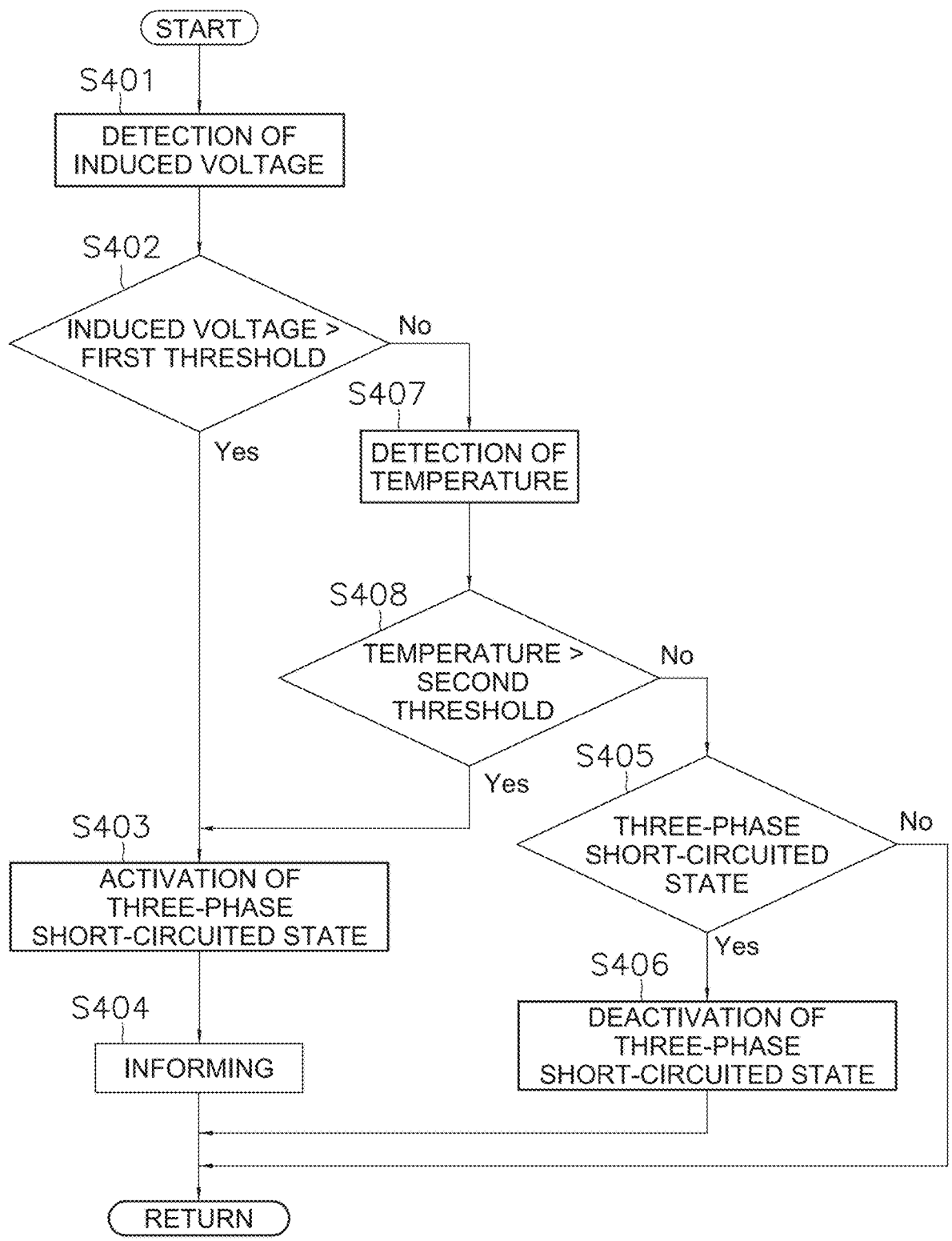
FIG. 9 is a flowchart showing a series of processes of a protection control for the inverter according to a fourth preferred embodiment of the present invention.

FIG. 9 is a flowchart showing a series of control processes executed by the controller 6*a* according to a fourth preferred embodiment of the present invention. The series of control processes in the fourth preferred embodiment is obtained by adding the processes of steps S207 and S208 in the second preferred embodiment to the series of processes in the third preferred embodiment, and is, except for this, similar to the series of processes in the third preferred embodiment. The processes of steps S401 to S406, described more specifically, are similar to the processes of steps S301 to S306 shown in FIG. 8. The processes of steps S407 and S408 are similar to the processes of steps S207 and S208 shown in FIG. 7.

Figure 10:
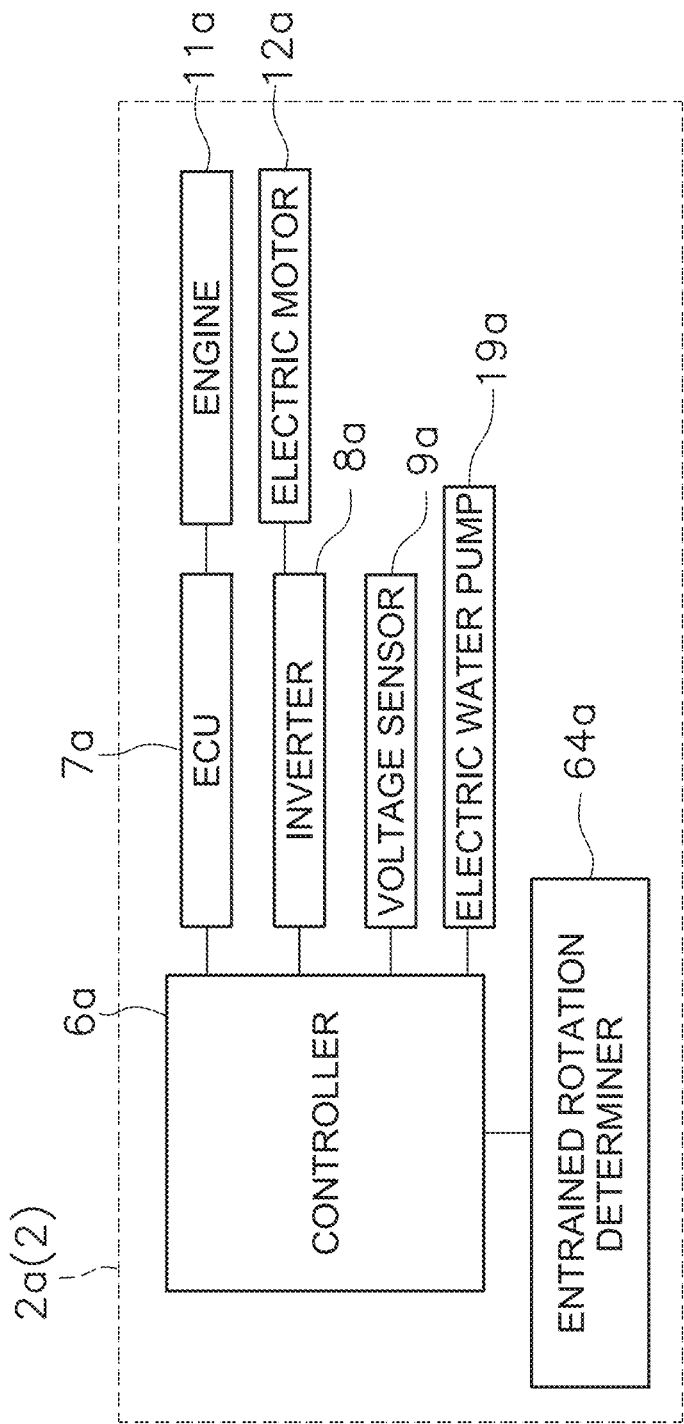
FIG. 10 is a block diagram showing a configuration of a first outboard motor according to a fifth preferred embodiment of the present invention.

FIG. 10 is a block diagram showing a configuration of the first outboard motor 2*a* according to a fifth preferred embodiment of the present invention. The first outboard motor 2*a* includes an entrained rotation determiner 64*a*. The entrained rotation determiner 64*a* determines whether or not entrained rotation of the electric motor 12*a* occurs, and outputs a determination result as an electric signal to the controller 6*a*. In the present preferred embodiment, the entrained rotation determiner 64*a* outputs the electric signal to the controller 6*a* when it is determined that entrained rotation of the electric motor 12*a* occurs.

The controller 6a executes a protection control to protect the inverter 8a when the entrained rotation determiner 64a determines that entrained rotation of the electric motor 12a occurs. For example, the entrained rotation determiner 64a determines whether or not the electric motor 12a is being rotated even without being driven. For example, the entrained rotation determiner 64a may determine that entrained rotation of the electric motor 12a occurs when the electric motor 12a is being rotated at greater than a predetermined rotational speed even without being driven. The entrained rotation determiner 64a may determine whether or not entrained rotation of the electric motor 12a occurs based on an operating signal outputted from the marine operating device 3. The entrained rotation determiner 64a may be included in the controller 6a. For example, the controller 6a may determine that entrained rotation of the electric motor 12a occurs when the electric motor 12a is being rotated at greater than the predetermined rotational speed. The second outboard motor 2b includes an entrained rotation determiner as well, albeit this is not shown in the drawings.

Figure 11:
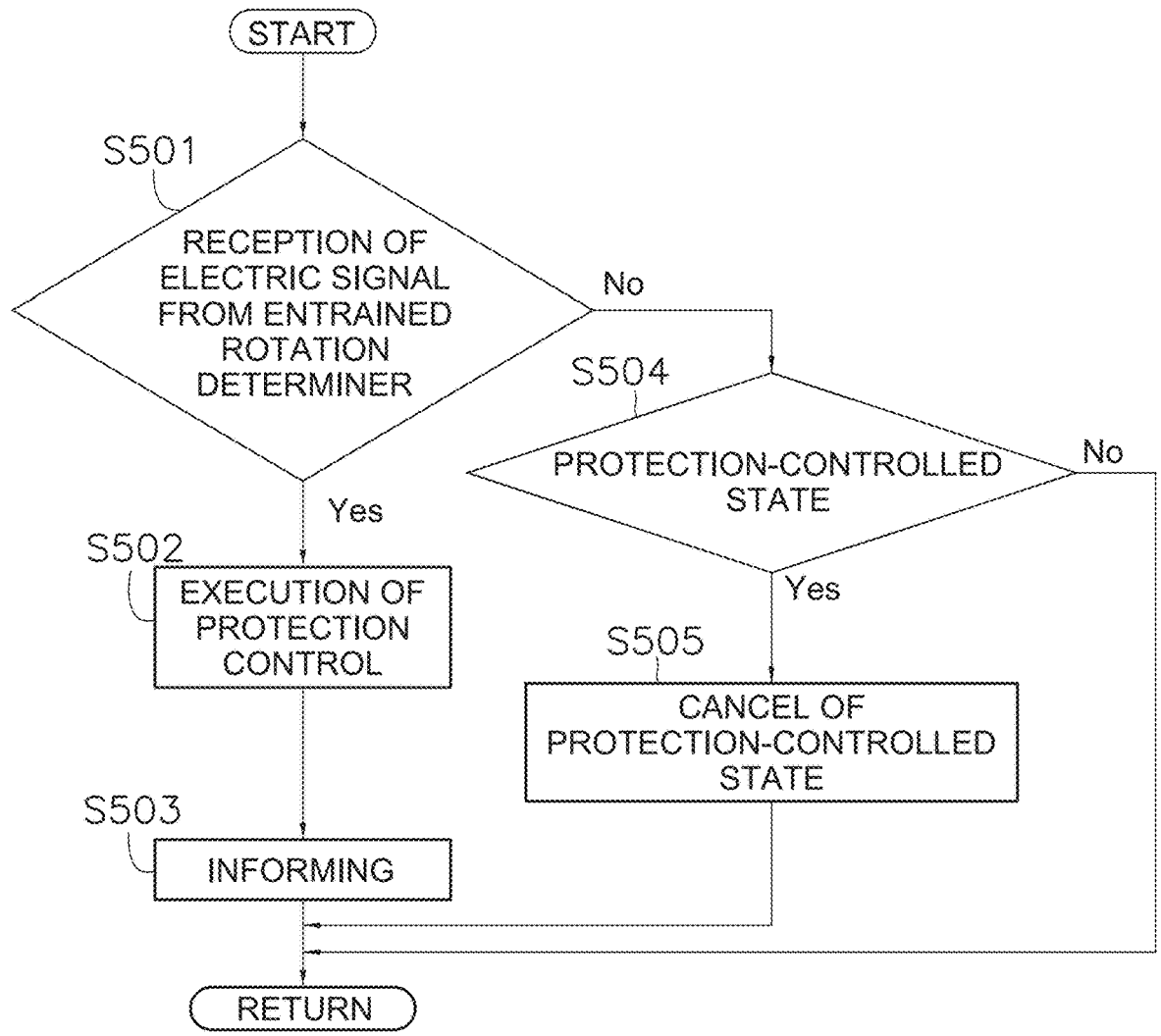
FIG. 11 is a flowchart showing a series of processes of protection control for the inverter according to the fifth preferred embodiment of the present invention.

FIG. 11 is a flowchart showing a series of control processes executed by the controller 6a according to the fifth preferred embodiment. In step S501, the controller 6a determines whether or not the controller 6a has received an electric signal from the entrained rotation determiner 64a. When it is determined that the controller 6a has received the electric signal from the entrained rotation determiner 64a, the controller 6a executes the process of step S502.

In step S502, the controller 6a executes the protection control to protect the inverter 8a as described above. In step S503, the controller 6a informs the watercraft operator that the protection control is being executed.

In step S501, when it is determined that the controller 6a has not received the electric signal from the entrained rotation determiner 64a, the controller 6a executes the process of step S504. In step S504, the controller 6a determines whether or not the inverter 8a is in a protection-controlled state, i.e., whether or not the protection control is being executed. When it is determined that the protection control is being executed for the inverter 8a, the controller 6a executes the process of step S505. In step S505, the controller 6a cancels the protection-controlled state of the inverter 8a.

The preferred embodiments of the present invention have been explained above. However, the present invention is not limited to the preferred embodiments described above, and a variety of changes can be made without departing from the gist of the present invention. For example, the configuration of the outboard motor 2 and/or that of the marine operating device 3 may be changed without being limited to those in the preferred embodiments described above.

In the preferred embodiments described above, the plurality of outboard motors 2 include two outboard motors, i.e., the first and second outboard motors 2a and 2b. Alternatively, the plurality of outboard motors 2 may include three or more outboard motors. For example, the plurality of outboard motors 2 may further include a third outboard motor configured in similar manner to the first outboard motor 2a. The third outboard motor may be located between the first and second outboard motors 2a and 2b.

In the preferred embodiments described above, the outboard motor 2 has been exemplified as an exemplary marine propulsion device. However, the present invention may be applied to an inboard/outboard motor.

In the preferred embodiments described above, the main battery 25 is provided to supply electric power to the first and second outboard motors 2a and 2b. Alternatively, batteries may be provided in correspondence to the first and second outboard motors 2a and 2b, respectively. As another alternative, the drive battery 26 does not have to be provided, and the main battery 25 may also function as the drive battery 26.

In the preferred embodiments described above, the power transmission 13a is configured to transmit mechanical power to the propeller shaft 10a from either one of the engine 11a and the electric motor 12a. Alternatively, the power transmission 13a may transmit both mechanical power of the engine 11a and that of the electric motor 12a.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine propulsion system comprising:
    a plurality of marine propulsion devices each including:
        a propeller shaft;
        an engine;
        an electric motor;
        a power transmission to transmit mechanical power to the propeller shaft from at least one of the engine and the electric motor;
        an inverter to output electric power inputted thereto to the electric motor after converting the electric power;
        a voltage sensor to detect an induced voltage generated by the electric motor; and
        a controller configured or programmed to execute a protection control to protect the inverter when the induced voltage is greater than a first threshold while the electric motor is not being driven.

2. The marine propulsion system according to claim 1, wherein each of the plurality of marine propulsion devices further includes:
    a cooling water passage connected to the inverter; and
    an electric water pump connected to the cooling water passage; and
    the controller is configured or programmed to cool the inverter by driving the electric water pump as the protection control.

3. The marine propulsion system according to claim 2, wherein in each of the plurality of marine propulsion devices, the controller is configured or programmed to stop the electric water pump from being driven when the induced voltage is less than or equal to the first threshold.

4. The marine propulsion system according to claim 1, wherein
    each of the plurality of marine propulsion devices further includes a temperature sensor to detect a temperature of the inverter; and
    in each of the plurality of marine propulsion devices, the controller is configured or programmed to execute the protection control when the temperature of the inverter is greater than a second threshold while the electric motor is stopped from being driven.

5. The marine propulsion system according to claim 1, wherein
    in each of the plurality of marine propulsion devices, the controller is configured or programmed to bring the inverter into a three-phase short-circuit state as the protection control.

6. The marine propulsion system according to claim 5, wherein in each of the plurality of marine propulsion devices, the controller is configured or programmed to cancel the three-phase short-circuit state of the inverter when the induced voltage is less than or equal to the first threshold.

7. The marine propulsion system according to claim 1, further comprising:
an informer to inform a watercraft operator that the controller has executed the protection control.

8. A method of controlling a marine propulsion system, the marine propulsion system including a plurality of marine propulsion devices each including a propeller shaft, an engine, an electric motor, a power transmission to transmit mechanical power to the propeller shaft from at least one of the engine and the electric motor, and an inverter to output electric power inputted thereto to the electric motor after converting the electric motor, the method comprising:
detecting an induced voltage generated by the electric motor; and
executing a protection control to protect the inverter when the induced voltage is greater than a first threshold while the electric motor is not being driven.

9. The method according to claim 8, wherein each of the plurality of marine propulsion devices further includes:
a cooling water passage connected to the inverter; and
an electric water pump connected to the cooling water passage; and
the protection control includes cooling the inverter by driving the electric water pump.

10. The method according to claim 9, further comprising:
stopping the electric water pump from being driven when the induced voltage is less than or equal to the first threshold.

11. The method according to claim 8, further comprising:
detecting a temperature of the inverter; and
executing the protection control when the temperature of the inverter is greater than a second threshold while the electric motor is stopped from being driven.

12. The method according to claim 8, wherein the protection control includes bringing the inverter into a three-phase short-circuit state.

13. The method according to claim 12, further comprising:
canceling the three-phase short-circuit state of the inverter when the induced voltage is less than or equal to the first threshold.

14. The method according to claim 8, further comprising:
informing a watercraft operator that the inverter is performing the protection control.

15. A marine propulsion system comprising:
a plurality of marine propulsion devices each including:
a propeller shaft;
an electric motor;
a power transmission to transmit mechanical power to the propeller shaft from the electric motor;
an inverter to output electric power inputted thereto to the electric motor after converting the electric power;
a voltage sensor to detect an induced voltage generated by the electric motor; and
a controller configured or programmed to execute a protection control to protect the inverter when the induced voltage is greater than a first threshold while the electric motor is not being driven.

* * * * *